United States Patent Office 3,557,143
Patented Jan. 19, 1971

3,557,143
BRIDGED BICYCLIC FERROCENE ETHERS
AND THIOETHERS
John T. Suh and Claude I. Judd, Mequon, Wis., assignors to Colgate-Palmolive Company, New York, N.Y., a corporation of Delaware
No Drawing. Filed Aug. 30, 1967, Ser. No. 664,276
Int. Cl. C07d 7/04, 65/05; C07f 15/02
U.S. Cl. 260—327                3 Claims

ABSTRACT OF THE DISCLOSURE

The compounds are bridged bicyclic ferrocene ethers and thioethers useful as pesticides, fungicides, hematinic agents, hydrocarbon dyes and fuel additives. Compounds disclosed include 1,1'-($\alpha,\alpha'$-epoxy-$\gamma$-phenyl-pentamethylene)ferrocene and 1,1'-($\alpha,\alpha'$-thia-$\gamma$-phenylpentamethylene)ferrocene.

BACKGROUND OF THE INVENTION

The invention pertains to ferrocene derivatives. Ferrocene is the commonly accepted name for dicyclopentadienyliron or biscyclopentadienyliron. A wide variety of derivatives of ferrocene have been prepared including the simple cyclic ethers (T. A. Washburn, Jr., et al., J. Org. Chem., 26, 1671 (1961)). In addition, the use of specific ferrocene derivatives as pesticides, fungicides, hematinics, hydrocarbon inks and fuel additives has been proposed (see U.S. Pat. Nos. 3,035,978, 3,217,019 and 3,322,793).

SUMMARY OF THE INVENTION

The present invention relates to novel ferrocene derivatives of the formula

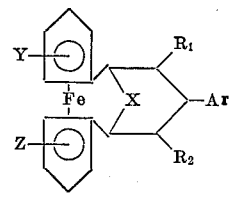

in which X is oxygen or sulfur, Y and Z are normal ring substituents, $R_1$ and $R_2$ are hydrogen, lower alkyl, cycloalkyl, aryl or aralkyl and Ar is an aryl or a heterocyclic group. It also relates to methods of preparing and using the compounds.

DETAILED DESCRIPTION

The compounds of the invention have the following formula

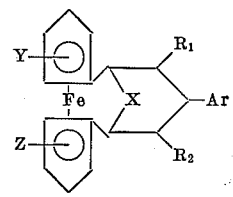

in which X is oxygen or sulfur, Y and Z are preferably hydrogen but may also be a lower alkyl of 1 to 4 carbon atoms or a cyclo-lower alkyl of 3 to 7 carbon atoms, $R_1$ and $R_2$ are hydrogen, lower alkyl from 1 to 8 carbon atoms such as methyl, ethyl, butyl and hexyl, a cycloalkyl of 3 to 7 carbon atoms such as cyclopropyl, cyclohexyl and cyclopentyl, cycloalkyl-lower alkyl in which the cycloalkyl has 3 to 7 carbon atoms such as cyclopentyl ethyl and cyclohexyl methyl, an aryl such as phenyl which includes nuclear substituted phenyls such as p-methoxyphenyl and o-chlorophenyl, an aralkyl of 7 to 15 carbon atoms especially phenyl-lower alkyl which includes benzyl, phenethyl, phenylisopropyl, and phenylbutyl and including nuclear substituted phenyl-lower alkyls such as p-methoxy benzyl, and Ar is an aryl such as phenyl which includes nuclear substituted phenyls such as p-methoxyphenyl, o-chlorophenyl, p-dimethylaminoethoxyphenyl and p-benzyloxyphenyl and heterocyclic groups such as pyridyl, thienyl, furyl, pyrryl and indolyl.

The compounds of the present invention are conveniently prepared by reacting an appropriate 1,1'-diacetyl ferrocene with a suitable aromatic or heterocyclic aldehyde in a nonparticipating solvent such as dimethylformamide to form the corresponding 1,1'-($\alpha,\alpha'$-diketo-$\gamma$-aryl or heterocyclic-pentamethylene)ferrocene. The diketo derivative can then be treated with sodium borohydride to form the corresponding dihydroxy compound which upon treatment with acetic acid forms the corresponding bicyclic ether, the 1,1'-($\alpha,\alpha'$-epoxy-$\gamma$-aryl or heterocyclic-pentamethylene)ferrocene. If desired, the diketo derivative can be converted directly to the bicyclic ether by treating it first with sodium borohydride and then heating the resulting intermediate.

The 1,1'-($\alpha,\alpha'$-thia-$\gamma$-aryl or heterocyclic-pentamethylene)ferrocenes may be conveniently prepared by treating the corresponding 1,1'-($\alpha,\alpha'$-dihydroxy-$\gamma$-aryl or heterocyclic-pentamethylene)ferrocene in a carboxylic acid containing 1 to 4 carbon atoms such as glacial acetic acid to which a catalytic amount of sulfuric acid has been added with hydrogen sulfide gas.

The described processes may be illustrated as follows:

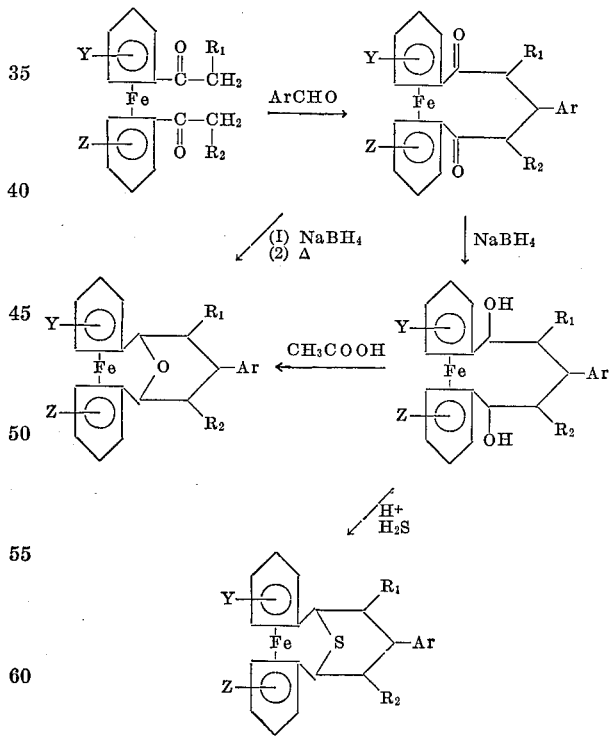

in which all symbols are as previously described and do not interfere with or partake in the reactions.

Representative of the aldehydes that may be employed in the described process are:
Benzaldehyde,
2-furaldehyde,
2-thiophenecarboxaldehyde,
Pyrrole-2-carboxaldehyde, and
Indole-3-carboxaldehyde.

Representative of the intermediate and final compounds which may be prepared by the above processes are:

1,1'-[α,α'-diketo-γ-(phenyl)-pentamethylene]ferrocene,
1,1'-[α,α'-diketo-γ-(o-chlorophenyl)-pentamethylene]-ferrocene,
1,1'-[α,α'-diketo-γ-(p-benzyloxyphenyl)pentamethylene]-ferrocene,
1,1'-[α,α'-diketo-γ-(p-N-diethylaminoethoxyphenyl)-pentamethylene]ferrocene,
1,1'-[α,α'-diketo-γ-(4''-pyridyl)-pentamethylene]-ferrocene,
1,1'-[α,α'-diketo-γ-(p-chlorophenyl)-pentamethylene]-ferrocene,
1,1'-[α,α'-diketo-γ-(2''-furyl)-pentamethylene]ferrocene,
1,1'-[α,α'-diketo-γ-(2''-thienyl)-pentamethylene]ferrocene,
1,1'-[α,α'-diketo-γ-(2''-pyrrolyl)-pentamethylene]ferrocene,
1,1'-[α,α'-diketo-γ-(3''-indolyl)-pentamethylene]ferrocene,
1,1'-(α,α'-dihydroxy-γ-phenyl-pentamethylene)ferrocene,
1,1'-[α,α'-dihydroxy-γ-(o-chlorophenyl)-pentamethylene]-ferrocene,
1,1'-[α,α'-dihydroxy-γ-(p-benzoyloxyphenyl)-pentamethylene]ferrocene,
1,1'-[α,α'-dihydroxy-γ-(p-N-diethylaminoethoxyphenyl)-pentamethylene]ferrocene,
1,1'-[α,α'-dihydroxy-γ-(4''-pyridyl)-pentamethylene]-ferrocene,
1,1'-[α,α'-dihydroxy-γ-(p-chlorophenyl)-pentamethylene]-ferrocene,
1,1'-[α,α'-dihydroxy-γ-(2''-furyl)-pentamethylene]-ferrocene,
1,1'-[α,α'-dihydroxy-γ-(2''-thienyl)-pentamethylene]ferrocene,
1,1'-[α,α'-dihydroxy-γ-(2''-pyrrolyl)-pentamethylene]-ferrocene,
1,1'-[α,α'-dihydroxy-γ-(3''-indolyl)-pentamethylene]ferrocene,
1,1'-(α,α'-epoxy-γ-phenyl-pentamethylene)ferrocene,
1,1'-[α,α'-epoxy-γ-(o-chlorophenyl)-pentamethylene]-ferrocene,
1,1'-[α,α'-epoxy-γ-(p-benzyloxyphenyl)-pentamethylene]-ferrocene,
1,1'-[α,α'-epoxy-γ-(p-N-diethylaminoethoxyphenyl)-pentamethylene]ferrocene,
1,1'-[α,α'-epoxy-γ-(4''-pyridyl)-pentamethylene]ferrocene,
1,1'-[α,α'-epoxy-γ-(p-chlorophenyl)-pentamethylene]-ferrocene,
1,1'-[α,α'-epoxy-γ-(2''-furyl)-pentamethylene]ferrocene,
1,1'-[α,α'-epoxy-γ-(2''-thienyl)-pentamethylene]ferrocene,
1,1'-[α,α'-epoxy-γ-(2''-pyrrolyl)-pentamethylene]ferrocene,
1,1'-[α,α'-epoxy-γ-(2''-indolyl-pentamethylene]ferrocene,
1,1'-(α,α'-thia-γ-phenylpentamethylene)ferrocene,
1,1'-[α,α'-thia-γ-(o-chlorophenyl)-pentamethylene]ferrocene,
1,1'-[α,α'-thia-γ-(p-benzyloxyphenyl)-pentamethylene]-ferrocene,
1,1'-[α,α'-thia-γ-(p-N-diethylaminoethoxyphenyl)-pentamethylene]ferrocene,
1,1'-[α,α'-thia-γ-(2''furyl)-pentamethylene]ferrocene,
1,1'-[α,α'-thia-γ-(2''-thienyl)-pentamethylene]ferrocene,
1,1'-[α,α'-thia-γ-(2''-pyrrolyl)-pentamethylene]ferrocene,
1,1'-[α,α'-thia-γ-(2''-indolyl)-pentamethylene]ferrocene
1,1'-[α,α'-thia-γ-(4''-pyridyl)-pentamethylene]ferrocene, and
1,1'-[α,α'-thia-γ-(p-chlorophenyl)-pentamethylene]ferrocene.

The ferrocene derivatives of the present invention may be employed as petroleum product additives, especially antiknock agents, in the manner described in U.S. Pat. No. 3,217,091. In addition, the novel ethers and thioethers of the present invention, as well as the dihydroxy intermediates, show promise as hydrocarbon dyes or inks as they are soluble in most organic solvents and possess distinctive yellow to yellow-orange colors. They may also be used as anti-corrosion agents, pesticides and fungicides.

The ferrocene derivatives of the present invention are also hematinic agents useful for the treatment of iron deficiencies in animals, especially piglets and humans. The compounds 1,1'-(α,α'-epoxy-γ-phenyl-pentamethylene)ferrocene and 1,1'-(α,α'-thia-γ-phenylpentamethylene)ferrocene when evaluated in controlled studies in rats made anemic by maintenance on a low iron diet were found in oral doses of 3 mg./kg. of iron to be effective in correcting the diet-induced iron deficiency anemia.

In the evaluation procedure female rats were administered 3 mg. Fe/kg. of the compounds via a stomach tube five days a week for a two-week period. Controls were employed which received the vehicles but no iron containing compounds. Hemoglobin determinations were performed predrug and at one and two week intervals, in addition to a determination one week after the end of the dosing period. All the animals were maintained on a low iron diet and sacrificed at the end of the third week. The hemoglobin determinations demonstrated that the compounds were effective in preventing anemia in the animals.

When employed as hematinic agents the ferrocene derivatives are preferably combined with pharmaceutical diluents and formed into dosage forms suitable for administration such as tablets, capsules, syrups, elixirs, solutions, and the like. The oral route of administration is preferred, but the compounds may be administered parenterally if so desired.

Pharmaceutical carriers which are either liquid or solid may be employed. The preferred liquid carrier is water. However, suitable organic solvents such as propylene glycol may also be employed. Flavoring materials may be included if desired.

Solid pharmaceutical carriers such as starch, sugar and talc can be utilized to form powders. These powders can be used as such or can be tableted or used to fill gelatin capsules. Suitable lubricants such as magnesium stearate, binders such as gelatin, and disintegrating agents such as sodium carbonate in combination with citric acid may be employed in the formation of the tablets.

Unit dosage forms such as tablets and capsules may contain any suitable predetermined amount of one or more of the active ingredients and may be administered one or more at a time at regular intervals. Such unit dosage forms, however, should generally contain approximately 5 to 500 mg. of the ferrocene bicyclic ether.

A typical tablet may have the following composition:

| | Mg. |
|---|---|
| Ferrocene bicyclic ether or thioether | 250 |
| Polyvinylpyrrolidone (pharmaceutical grade) | 15 |
| Corn starch | 50 |
| Magnesium stearate | 3 |

The tablets are formed on a ⅜ inch deep cup punch and the tablets may be coated if desired.

A typical soft gelatin capsule, size 0, may have the following composition:

Ferrocene bicyclic ether or thioether—250 mg.
Polyethylene glycol 400—0.5 cc. (q.s. ad)

A typical oil solution may contain the following ingredients in each teaspoonful:

Ferrocene bicyclic ether or thioether—250 mg.
Preservatives and flavor—q.s.
Peanut oil—5 ml. (q.s. ad)

A typical aqueous suspension intended for oral administration may contain the following ingredients in each teaspoonful:

Ferrocene bicyclic ether or thioether—250 mg.
Sorbitol—1,250 cc.
Sodium carboxymethyl cellulose—50 mg.
Cellulose (microcrystalline)—500 mg.
Preservatives and flavor—q.s.
Water—5 cc. (q.s. ad)

The exact quantity of the composition to be administered, of course, will depend upon many factors including the elemental iron content of the compound and the nature and extent of the iron deficiency of the patient. However, generally speaking, the amount administered in a single day will be equivalent to about 5 mg. to about 500 mg. of elemental iron.

The following examples illustrate the preparation of the compounds of the invention:

EXAMPLE 1

1,1'-($\alpha,\alpha'$-diketo-$\gamma$-phenyl-pentamethylene)ferrocene

To a solution of 0.9 g. (0.022 mole) of sodium hydroxide in 20 of water is added 60 ml. of dimethylformamide and cooled to 0°. 1,1'-diacetylferrocene (2.7 g., 0.01 mole) is added in one portion and stirred until all is dissolved. A solution of 7.17 g. (0.011 mole) of benzaldehyde in 15 ml. of dimethylformamide is added in 2 minutes and stirred 1 hour while allowing the mixture to warm slowly to room temperature. The mixture is then cooled in an ice bath and the precipitated solids collected, washed with water, dried and recrystallized from 650 ml. of acetonitrile to yield 1,1'-($\alpha,\alpha'$-diketo-$\gamma$-phenyl-pentamethylene)ferrocene in the form of orange light textured needles, M.P. 294° (d.).

*Analysis.*—Calcd. for $C_{21}H_{18}FeO_2$ (percent): C, 70.41; H, 5.06; Fe, 15.59. Found (percent): C, 70.20; H, 4.96; Fe, 15.43.

EXAMPLE 2

1,1'-($\alpha,\alpha'$-dihydroxy-$\gamma$-phenyl-pentamethylene)ferrocene

To a dispersion of 10.0 g. (0.028 mole) of 1,1'-($\alpha,\alpha'$-diketo-$\gamma$-phenyl-pentamethylene)ferrocene in 400 ml. of isopropanol is added 4.2 g. (0.11 mole) of sodium borohydride and the mixture refluxed for 5 hours. The mixture is concentrated to dryness, 150 ml. ether and 100 ml. brine added and the mixture stirred for 10 minutes. The organic layer is separated, dried and concentrated to yield a semi-solid which is added to a mixture of 400 ml. of isopropanol and 4.2 g. (0.11 mole) of sodium borohydride and refluxed for 16 hours. The solution is concentrated to dryness, 150 ml. chloroform and 200 ml. brine added and stirred 10 minutes. The organic layer is separated, dried and concentrated to yield a solid which is recrystallized three times from ethanol and dried in vacuo at 105° to yield 1,1'-($\alpha,\alpha'$-dihydroxy-$\gamma$-phenyl-pentamethylene)ferrocene in the form of a yellow-orange crystalline solid, M.P. 185–190°.

*Analysis.*—Calcd. for $C_{21}H_{22}FeO_2$ (percent): C, 69.61; H, 6.12; Fe, 15.42. Found (percent): C, 69.80; H, 6.31; Fe, 15.19.

EXAMPLE 3

1,1'-($\alpha,\alpha'$-epoxy-$\gamma$-phenyl-pentamethylene)ferrocene

A mixture of 12.1 g. (0.034 mole) of 1,1'-($\alpha,\alpha'$-diketo-$\gamma$-phenyl-pentamethylene)ferrocene and 5.1 g. (0.135 mole) of sodium borohydride in 500 ml. of isopropanol is refluxed for 17 hours. The solution is cooled and concentrated in vacuo to yield an oil which is heated at 120–125° under high vacuum for 4 hours to yield a solid. The solid is chromatographed through aluminum oxide (200 g., 3× 35 cm.) using 1.6 liters of varying proportions of benzene and petroleum ether as an eluent to yield a material which upon recrystallization from 75 ml. of ethanol yields 1,1'-($\alpha,\alpha'$-epoxy-$\gamma$-phenyl-pentamethylene)ferrocene in the form of gold crystals, M.P. 148° (d.).

*Analysis.*—Calcd. for $C_{21}H_{22}FeO_2$ (percent): C, 69.61; H, 6.12; Fe, 15.42. Found (percent): C, 69.80; H, 6.31; Fe, 15.19.

EXAMPLE 4

1,1'-($\alpha,\alpha'$-thia-$\gamma$-phenyl-pentamethylene)ferrocene

To a solution of one drop of concentrated sulfuric acid in 50 ml. of glacial acetic acid saturated with hydrogen sulfide is added 2.0 g. (0.0055 mole) of crude 1,1'-($\alpha,\alpha'$-dihydroxy-$\gamma$-phenyl-pentamethylene)ferrocene dissolved in 30 ml. of benzene in 5 minutes. While passing hydrogen sulfide through the solution at a moderate rate, it is stirred at room temperature 0.5 hour and heated at 100–110° for 1 hour. It is cooled and concentrated in vacuo. The residue is dissolved in 250 ml. of chloroform, washed with 50 ml. of brine and once with 100 ml. of saturated sodium bicarbonate solution, dried and concentrated. The residue is chromatographed through aluminum oxide (100 g., 3× 16 cm.) using 300 ml. of 35% benzene in petroleum ether as an eluent to yield a solid material which is recrystallized from benzene to yield 1,1'-($\alpha,\alpha'$-thia-$\gamma$-phenyl-pentamethylene)ferrocene in the form of a yellow powder, M.P. 219–221°.

*Analysis.*—Calcd. for $C_{21}H_{20}FeS$ (percent): C, 70.00; H, 5.60; S, 8.90. Found (percent): C, 70.34; H, 5.57; S, 8.85.

We claim:
1. A compound of the formula

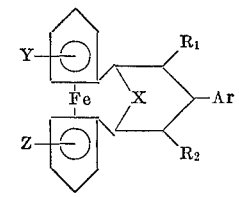

in which X is sulfur, Y and Z are hydrogen, lower alkyl of 1 to 4 carbon atoms or cyclo-lower alkyl of 3 to 7 carbon atoms, $R_1$ and $R_2$ are hydrogen, an alkyl of 1 to 8 carbon atoms, cycloalkyl of 3 to 7 carbon atoms, cycloalkyl-lower alkyl in which the cycloalkyl has 3 to 7 carbon atoms, phenyl, methoxyphenyl, chlorophenyl, benzyl, phenethyl, phenylisopropyl, phenylbutyl, and methoxybenzyl and Ar is phenyl, methoxyphenyl, chlorophenyl, benzyloxyphenyl and dimethylaminoethoxyphenyl.

2. A compound of claim 1 in which Y, Z, $R_1$ and $R_2$ are hydrogen.

3. A compound of claim 1 in which Y, Z, $R_1$ and $R_2$ are hydrogen and Ar is phenyl.

References Cited

UNITED STATES PATENTS 3,417,118   12/1968   Schnettler et al. _____ 260—439
3,382,267   5/1968    Suh _____ 260—439

OTHER REFERENCES

Fieser et al.: Org. Chem. (Heath, Boston, 1950), pp. 49–50.

HENRY R. JILES, Primary Examiner

C. M. SHURKO, Assistant Examiner

U.S. Cl. X.R.

8—76, 106—22; 252—386, 389; 260—294.8, 297, 270, 326.12, 326.15, 326.16, 326.5, 326.9, 332.3, 345, 332.5, 345.9, 439